J. W. KENNEDY.
Hose-Couplings.

No. 141,718.  Patented August 12, 1873.

Attest:
Thos. C Adams
William Steinhoff

Inventor:
Josiah W Kennedy

UNITED STATES PATENT OFFICE.

JOSIAH W. KENNEDY, OF ST. LOUIS, MISSOURI.

IMPROVEMENT IN HOSE-COUPLINGS.

Specification forming part of Letters Patent No. 141,718, dated August 12, 1873; application filed July 16, 1873.

*To all whom it may concern:*

Be it known that I, JOSIAH W. KENNEDY, of the city and county of St. Louis and State of Missouri, have invented certain Improvements in Hose-Couplings, of which the following is a specification:

My invention consists in the arrangement inside of the hose-pipe, at its end, of a tube section having a raised Λ-shaped rim on its outer surface. The rear part of said tube section is screw-threaded for the reception of a nut that forces forward a clamping-sleeve provided with a flaring rim to clamp the hose tightly against the raised Λ-shaped rim of the internal tube section. The rear end of said clamping-sleeve may also be made flaring, and the forward end of the nut tapering, so as to form a secondary clamp at the end of the hose. In this case a friction-ring will be interposed between the parts to prevent the usual coupling-sleeve binding against the end of the hose.

Figure 1:
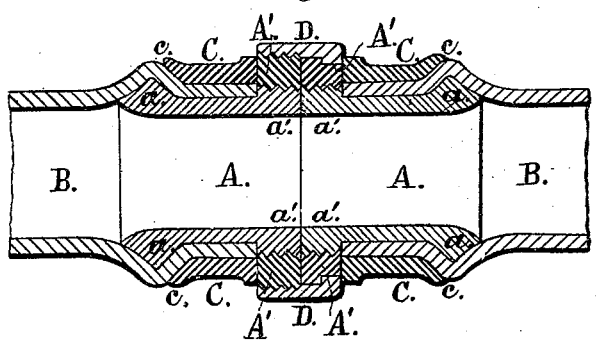
Figure 2:
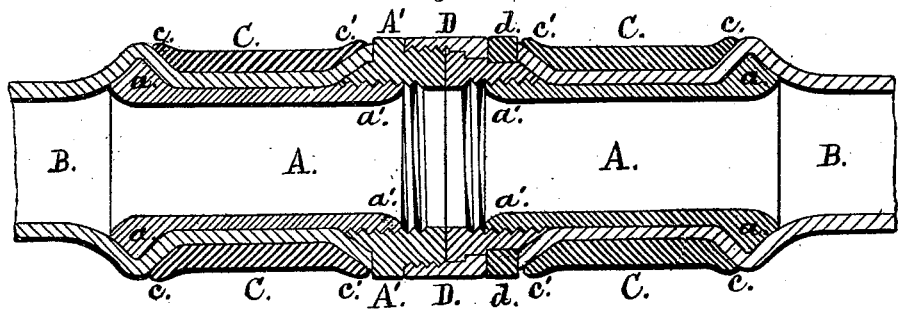

Figure 1 is a sectional elevation of my improved coupling. Fig. 2 is a sectional elevation of a modified form of same.

A is an internal tube section, having a raised Λ-shaped rim, $a$, on its outer surface. The rear portion $a$ of said tube section is screw-threaded for the reception of the nut A'. C is a clamping-sleeve, the front edge $c$ of which is flared outwardly, as indicated in Fig. 1. Said collar is arranged on the outside of the hose B, and is moved or impelled forward to clamp the hose tightly against the rim $a$ by the nut A'. In the modified form shown in Fig. 2 the rear part $c'$ of the sleeve C is also made flaring and the forward end of the nut A' tapering, so that the end of the hose B will be clamped between said flaring and tapering parts when the nut A' moves forward. $d$ is a friction-ring arranged between the sleeve C and the usual loose coupling cap or sleeve D to prevent said sleeve binding against the end of the hose.

In applying my said improvement to a hose-pipe, the tube section A is first introduced inside of the hose B; the sleeve C is then slipped over the hose B and the nut A screwed onto the screw-threaded part $a'$ of the tube section A, so as to force the sleeve C forward to clamp the hose firmly against the raised rim $a$ of the tube section A.

What I claim as my invention is—

1. The internal tube section A, having raised Λ-shaped rim $a$ and screw-threaded portion $a'$, in combination with the nut A' and sleeve C having flaring end $c$, as and for the purpose set forth.

2. The combination and arrangement of the tube section A, having raised rim $a$ and screw-threaded portion $a'$, with the nut A', collar C, $c$, friction-ring $d$, and coupling-sleeve D, as and for the purpose set forth.

JOSIAH W. KENNEDY.

Witnesses:
T. C. ADAMS,
W. G. GAINES.